(12) United States Patent
Kwak

(10) Patent No.: US 9,000,893 B2
(45) Date of Patent: Apr. 7, 2015

(54) FOOD SOURCE INFORMATION TRANSFERRING SYSTEM AND METHOD FOR A MEAT-PACKING FACILITY

(71) Applicant: Hana Micron America Inc., Milpitas, CA (US)

(72) Inventor: Sung Bok Kwak, Milpitas, CA (US)

(73) Assignee: Hana Micron America, Inc., Milpitas, CA (US)

(*) Notice: Subject to any disclaimer, the term of this patent is extended or adjusted under 35 U.S.C. 154(b) by 129 days.

(21) Appl. No.: 13/648,233

(22) Filed: Oct. 9, 2012

(65) Prior Publication Data

US 2014/0097941 A1  Apr. 10, 2014

(51) Int. Cl.

| | |
|---|---|
| *H04Q 5/22* | (2006.01) |
| *G08B 13/14* | (2006.01) |
| *G08B 23/00* | (2006.01) |
| *A22B 3/00* | (2006.01) |
| *A22C 18/00* | (2006.01) |
| *A22C 17/10* | (2006.01) |
| *A22C 21/00* | (2006.01) |
| *A22B 5/00* | (2006.01) |
| *G06F 17/00* | (2006.01) |
| *B07C 5/02* | (2006.01) |
| *G06K 19/07* | (2006.01) |
| *A22C 17/00* | (2006.01) |
| *G06Q 10/08* | (2012.01) |

(52) U.S. Cl.
CPC ............ *G06K 19/0723* (2013.01); *A22B 5/007* (2013.01); *A22C 17/008* (2013.01); *G06Q 10/0833* (2013.01)

(58) Field of Classification Search
CPC ........ A22B 5/0064; A22B 7/007; A22B 7/00; A22B 5/007; G06Q 10/087; G06Q 50/06; A22C 17/10; G08B 13/19697; G08B 13/19656; G08B 13/19682; G06F 19/3418; G06F 3/147
USPC ....................... 340/10.1–10.6, 572.1–572.96; 452/150–159, 167; 235/375; 209/3.1–3.3
See application file for complete search history.

(56) References Cited

U.S. PATENT DOCUMENTS

| 4,597,495 | A  * | 7/1986  | Knosby ............................. 209/3.3 |
| 4,854,328 | A  * | 8/1989  | Pollack ........................... 600/549 |
| 5,478,990 | A  * | 12/1995 | Montanari et al. ............. 235/375 |
| 6,231,435 | B1 * | 5/2001  | Pilger ............................. 452/157 |
| 6,545,604 | B1 * | 4/2003  | Dando et al. ................ 340/572.1 |

(Continued)

*Primary Examiner* — Steven Lim
*Assistant Examiner* — Muhammad Adnan
(74) *Attorney, Agent, or Firm* — Invent Capture, LLC.; Samuel S. Cho

(57) ABSTRACT

A food source information transferring system for a livestock meat-packing facility and a related method are disclosed. In one embodiment, the food source information transferring system is capable of reading tag-identifying information in a hook RFID tag incorporated in a hook that can be hung on a hook machine. An animal carcass attached to the hook then undergoes meat chopping, cutting, and/or packing operations in the meat-packing facility. For each meat package produced, a data set associated with the tag-identifying information in the hook RFID tag can be paired with a data set associated with a meat package label attached to the meat package. This dynamic and robust data association between the hook RFID tag and the meat package label enables a food source information database in the food source information transferring system to preserve and trace detailed food source information at various levels of meat production and processing.

18 Claims, 10 Drawing Sheets

A meat-packing facility process flow for food source information pairing

(56) References Cited

U.S. PATENT DOCUMENTS

| | | | |
|---|---|---|---|
| 7,277,889 B2 * | 10/2007 | Addonisio et al. | 1/1 |
| 7,504,949 B1 * | 3/2009 | Rouaix et al. | 340/572.1 |
| 7,552,860 B2 * | 6/2009 | Tani et al. | 235/375 |
| 8,079,897 B2 * | 12/2011 | Knopik et al. | 452/150 |
| 8,149,125 B2 * | 4/2012 | Geissler et al. | 340/573.2 |
| 8,407,103 B2 * | 3/2013 | Farmer et al. | 705/26.61 |
| 8,478,195 B1 * | 7/2013 | Hewinson | 455/41.1 |
| 2003/0062001 A1 * | 4/2003 | Andersson | 119/174 |
| 2006/0145814 A1 * | 7/2006 | Son et al. | 340/10.1 |
| 2009/0251294 A1 * | 10/2009 | Kawamura et al. | 340/10.51 |
| 2012/0161645 A1 * | 6/2012 | Dingemans et al. | 315/153 |
| 2012/0182124 A1 * | 7/2012 | Joannes | 340/5.65 |
| 2013/0038453 A1 * | 2/2013 | Nishiyama et al. | 340/573.1 |
| 2013/0088354 A1 * | 4/2013 | Thomas | 340/572.1 |
| 2013/0162433 A1 * | 6/2013 | Muhsin et al. | 340/573.1 |
| 2014/0014714 A1 * | 1/2014 | Tang | 235/375 |
| 2014/0097940 A1 * | 4/2014 | Kwak | 340/10.1 |

\* cited by examiner

A meat-packing facility process flow for food source information pairing

Two types of hooks incorporating hook RFID tags

Example of a carcass on a single hook getting chopped and placed into multiple packages

| Hook Tag Number: C200701 | Package Label: D1001 (Start Flag), D1002, D1003, D1004 (End Flag) |

301A

Example of one or more carcasses on multiple hooks getting chopped and grouped-packaged for a particular part of the meat (e.g. a sirloin package, a ribeye package, a T-bone steak package, and etc.)

| Hook Tag Numbers: C200702 (Start Flag), C200703, C200704, C200705 (End Flag) | Package Label: D1005 |

301B

An Embodiment of hook tag and package label information pairing displayed on a display panel in a Meat-Packing Facility

| Livestock Tag ID ⁄401 | Type ⁄403 | DOB ⁄405 | Gender ⁄407 | Owner ⁄409 | Vaccine Records ⁄411 | Animal Weight ⁄413 |
|---|---|---|---|---|---|---|
| A618208 | Premium | 7/17/2010 | F | KC Farms |  | 1140 lbs |

400

An example of data associated with a livestock (RFID or paper) tag

| Hook RFID Tag ID ⁄417 | Slaughterhouse / Plant ID ⁄419 | Livestock Tag(s) ID(s) ⁄421 | Status Information ⁄423 |
|---|---|---|---|
| C200402 | Midranch Co. #3 | A618208 |  |

415

An example of data associated with a hook RFID tag

| Package Label ID ⁄427 | Meat Packing Facility ID ⁄429 | Hook RFID Tag(s) ID(s) ⁄431 | Status Information ⁄433 |
|---|---|---|---|
| D3213 | Tender Packing Co. #12 | C200402 |  |

425

An example of data associated with a package label

FIG. 4

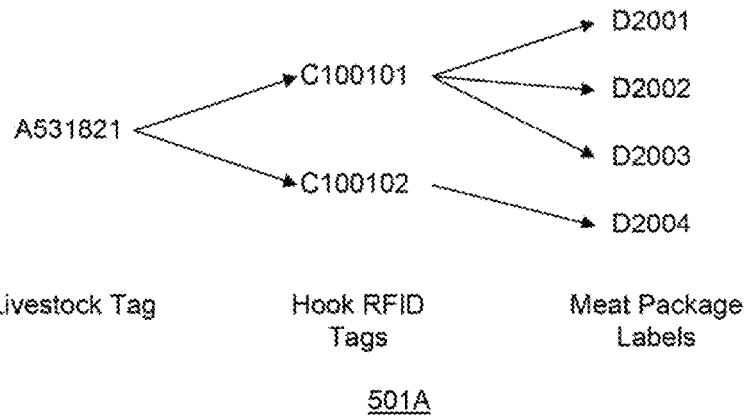
501A
Data association example of of a livestock tag, hook RFID tags, and meat package labels
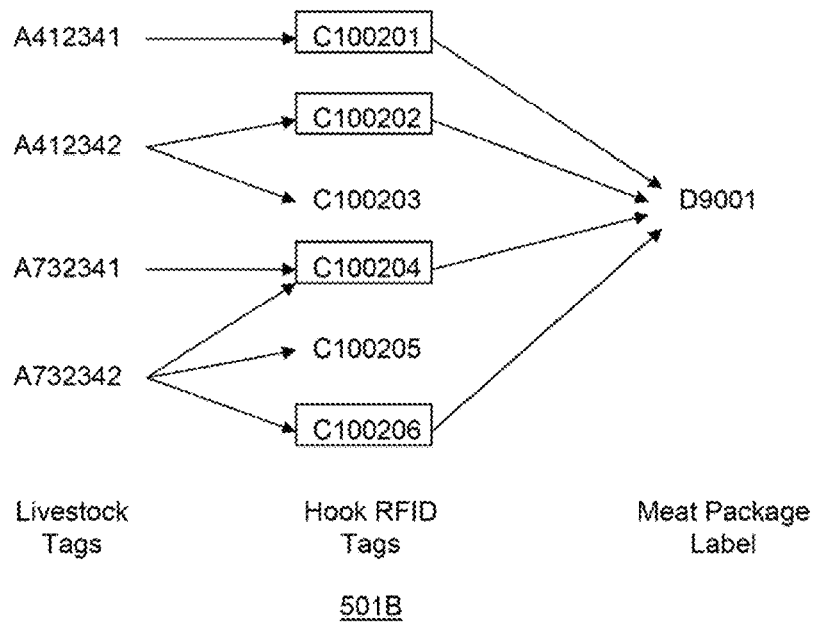
501B
Data association example of livestock tags, hook RFID tags, and a meat package label for grouped meat packages (e.g. a sirloin package, a ribeye package, a T-bone steak package, and etc.)
500
FIG. 5

An overview of food source information transfer process

600

A high-level device connection diagram for a food source information transferring system

700

An embodiment of a food source information transferring system

800

A method of pairing one or more package labels with a particular hook RFID tag

900

A method of paring a particular package label with one or more hook RFID tags
1000

US 9,000,893 B2

FOOD SOURCE INFORMATION TRANSFERRING SYSTEM AND METHOD FOR A MEAT-PACKING FACILITY

BACKGROUND OF THE INVENTION

The present invention generally relates to food source information tracking and transferring systems and methods. More specifically, the present invention relates to food source information transferring system and method for a meat-packing facility that chops and packages processed carcasses from a livestock slaughterhouse. Furthermore, the present invention also relates to transferring and pairing food source information from hook radio frequency identification (RFID) tags incorporated in a hook for a hook machine to individual meat packages with package labels during meat-packing operations.

Conventional food source information tracking methods from a livestock farm to meat processing and distribution chains often lack a desirable level of transparency, data robustness, and data security. In conventional food source information tracking methods, food source information originating from a particular livestock farm is often lost, corrupted, or compromised in meat processing and distribution channels such as livestock slaughterhouses and meat-packing facilities. For example, as paper tags or livestock animal RFID tags are removed from animal carcasses on a hook machine in a livestock slaughterhouse, much of the original food source information contained on the paper tags or livestock animal RFID tags are lost, corrupted, or compromised as each carcass undergoes meat processing and chopping operations. The loss of original producer-level food source information worsens further as subsequent meat processing, such as meat-chopping, meat-packing, and additional transit operations are performed after animal carcasses are initially processed in the livestock slaughterhouse. In some cases, only the country of origin or the state of origin may remain as a single piece of retained information by the time meat is completely processed and packaged in a meat-packing facility.

In many cases, conventional food source information tracking methods undermine and compromise data security and data integrity when food source information is transferred from one meat production or processing operation to another meat production or processing operation, because much of the information transfer process is manual and labor-intensive without automated and secure data transfer mechanism. For example, conventional paper tags require hand transcriptions to transfer data from one operation to another, while conventional long-frequency (LF) RFID tags merely provide an undesirably short tag-reading distance that hampers implementation of a high-throughput, automated, and secure food source information transferring mechanism.

Moreover, in recent years, outbreak control and containment of contagious diseases and epidemics have become an important concern in modern livestock farming and meat processing and sales industry. If contagious livestock diseases or epidemics are discovered after meat is already processed and distributed, accurately tracing the sources of meat products that may have been impacted by the contagious livestock diseases or epidemics is a challenging task when only high-level food source information, such as the country or the state of origin, is retained in processed meat packages. Conventional meat product tracing methods for reduction of public health risks do not typically provide a fine level of detail or pinpoint accuracy to prevent distribution or sale of the dangerous meat products efficiently. For example, meat products from a particular country or a state may be entirely discarded or banned as a group, even if the source of contagious livestock diseases or epidemics may have been limited to one particular livestock farm, one particular slaughterhouse, or one particular meat-packing facility among hundreds of meat processing and distribution channels in that country or state. The lack of fine details in food source information as well as the lack of data transparency and security in conventional food source tracking methods often necessitate mass disposal of meat products and import bans from an entire country or a state.

Furthermore, the lack of fine details in food source information in conventional food source information tracking methods also make accurate tracking of livestock transactions throughout meat processing and distribution channels difficult for local, state, and national governments. The lack of transactional data transparency among livestock farms, slaughterhouses, meat-packing facilities, and distribution channels impede governments from providing helpful oversight and effective agricultural policies. The governments may also find accurate taxation on livestock transactions difficult due to the lack of transactional data accuracy and transparency in meat processing and distribution channels.

Therefore, it may be beneficial to provide a food source information transferring system in a meat-packing facility that can accurately, securely, and electronically pair livestock farm-level information that are retained in an RFID tag per carcass to be associated with a package label for a meat package, even after meat chopping and packing operations are completed. Furthermore, it may also be beneficial to provide a method of transferring and tracking food source information between processed carcasses from a livestock slaughterhouse and a meat-packing facility responsible for chopping and packing the processed carcasses. In addition, it may also be beneficial to devise a holistic information technology (IT) infrastructure at various levels of meat processing and distribution chains for systematic and robust management of food source information.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a food source information transferring system for a meat-packing facility is disclosed. This food source information transferring system comprises: a data scan zone defined by an RFID signal projection from an RF antenna operatively connected to an RFID reader; a hook RFID tag incorporated or embedded in a hook that holds an animal carcass when the hook is hung on a hook machine, wherein the hook machine is designed to transport the animal carcass on the hook from one location to another location; the RFID reader configured to read from or write to the hook RFID tag when the hook RFID tag is inside the data scan zone, wherein the RFID reader is further configured to place a start flag or an end flag in a first data set associated with the hook RFID tag and/or in a second data set associated with a package label; a meat-packing facility' database system configured to assign a unique package label identification for a meat package containing chopped pieces of meat from the animal carcass; a labeling machine configured to generate the package label with the unique package label identification, which is printed or attached to the meat package; a food source information database operating on a CPU and a memory unit of a computer system device which is operatively connected to the RFID reader, the meat-packing facility's database system, and/or the labeling machine, wherein the food source information database is configured to pair the first data set associated with the hook RFID tag and the second data set associated with the package label; and a meat-packing facility operation controller unit operatively connected to the RFID reader and the food source information database, wherein the meat-packing facility operation controller unit at least partially controls the RFID reader and the food source information database.

In another embodiment of the invention, a method of transferring food source information among livestock producer-level food source data, slaughterhouse-level food source data, and meat-packing facility-level food source data is disclosed. This method comprises the steps of: placing an animal carcass to a hook machine with a hook containing a hook RFID tag; bringing the animal carcass on the hook machine to a data scan zone in a meat-packing facility; reading the hook RFID tag with an RF antenna and an RFID reader operatively connected to a food source information database; enabling a start flag for a first data set associated with the hook RFID tag, or for a second data set associated with a package label; fetching new package label information from a labeling machine, wherein the new package label information is part of the second data set; pairing the first data set associated with the hook RFID tag with the second data set associated with the package label in the food source information database; packing meat chopped from the animal carcass in a meat package; printing or attaching the package label from the labeling machine to the meat package; and if the meat package is completed, enabling an end flag for the first data set associated with the hook RFID tag or for the second data set associated with the package label, and storing a status code and paired information of the first data set and the second data set in the food source information database.

BRIEF DESCRIPTION OF DRAWINGS

FIG. 3 shows at least a portion of paired food source information displayed on a display panel in a meat-packing facility, in accordance with an embodiment of the invention.

FIG. 4 shows an example of data associated with a livestock tag, an example of data associated with a hook RFID tag, and an example of data associated with a package label in a food source information database, in accordance with an embodiment of the invention.

FIG. 5 shows a first data association example of a livestock tag, hook RFID tags, and meat package labels, and a second data association example of livestock tags, hook RFID tags, and a meat package label for grouped meat packages, in accordance with an embodiment of the invention.

DETAILED DESCRIPTION

Figure 1:
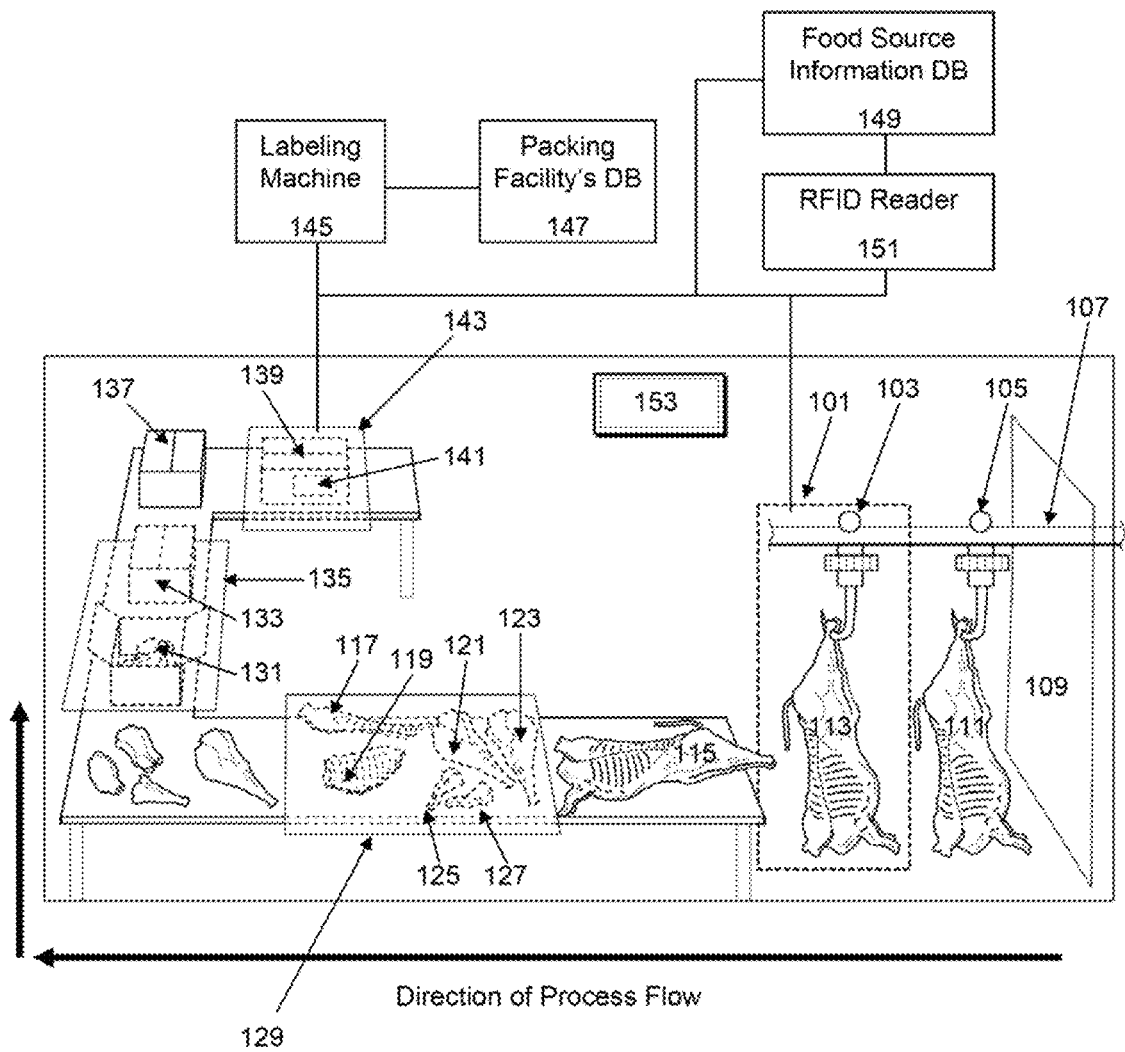
FIG. 1 shows a perspective view of a meat-packing facility and its process flow for food source information transfer and pairing, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble a food source information transferring system and a related method for a meat-packing facility. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "livestock" is defined as farm animals raised for use and/or profit. The term "livestock" can include, but are not limited to, cattle, sheep, pigs, goats, horses, donkeys, mules, and poultry (e.g. chickens, ducks, turkeys, and geese).

In addition, for the purpose of describing the invention, a term "carcass" is defined as a body of a slaughtered farm animal for human consumption or for other food or industrial use. For example, a carcass may be a dead body of a cattle, a sheep, a pig, a goat, a horse, a donkey, a mule, or poultry (e.g. a chicken, a duck, a turkey, or a goose).

Furthermore, for the purpose of describing the invention, a term "slaughterhouse" is defined as a meat-processing facility in which livestock animals are slaughtered and processed as usable and/or edible carcasses. A slaughterhouse may also integrate a refrigerator or a refrigeration facility to chill and store usable and/or edible carcasses for a particular period prior to subsequent meat processing, chopping, and packing operations.

In addition, for the purpose of describing the invention, "a hook machine" is defined as a carcass transport apparatus that can hang or accommodate one or more hooks holding at least a portion of a carcass.

Moreover, for the purpose of describing the invention, a term "epidemic" and a term "contagious disease" are defined as an infectious disease for animals and/or humans, wherein the infectious disease may spread by physical contact, air, liquid, ingestion, or another method of disease transmission.

In addition, for the purpose of describing the invention, a term "radio frequency identification," or RFID, is defined as a wireless signal-based identification of a wirelessly-accessible tag, called an "RFID tag" using a wirelessly-accessible tag reader, called "RFID reader." In general, an RFID tag contains information which may be written and/or read by the RFID reader, an RF antenna operatively connected to the RFID reader, or another tag information access device. In a preferred embodiment of the invention, RFID operates in ultra high frequencies (UHF) to achieve longer read/write ranges (e.g. up to several meters) and multiple tag read/write capabilities, which were difficult to achieve in conventional low frequency (LF)-based RFID devices exhibiting shorter read/write ranges (e.g. approximately up to 30 centimeters) and single tag scan functionalities. In a preferred embodiment of the invention, the UHF range for the RFID reader is defined by ISO/IEC 18000-6 air interface standard, which utilizes an operating frequency range of 860 MHz~960 MHz. In another embodiment of the invention, the UHF operating frequency range may be defined more broadly as 300 MHz~3 GHz. In general, the conventional LF operating frequencies are below the UHF RFID tag reader operating frequency ranges.

Furthermore, for the purpose of describing the invention, a term "food source information database" is defined as a data bank comprising food source-related data. For example, a food source information database may contain multiple levels of food source information from livestock production, meat processing, and distribution chains, wherein the multiple levels of food source information can be traced to a particular livestock farm, a particular livestock slaughterhouse, a meat-packing facility, a particular distribution channel, and/or another entity in livestock production, meat processing, and distribution chains. In a preferred embodiment of the invention, the food source information database operates on a CPU and a memory unit of a computer server or another computing system device.

In addition, for the purpose of describing the invention, a term "pairing" or a variation of this word is defined as linking or associating one set of data with another set of data. For example, if a livestock RFID tag is "paired" with a hook RFID tag, a set of data related to the livestock RFID tag is linked or associated with another set of data related to the hook RFID tag.

Furthermore, for the purpose of describing the invention, a term "meat-packing" is defined as packaging cut or chopped meat pieces into a meat package. A "meat-packing" facility may conduct cutting or chopping of meat pieces from a carcass, followed by packaging the cut or chopped meat pieces into a meat package.

In addition, for the purpose of describing the invention, a term "meat processing" is defined as meat-handling operations from a slaughterhouse, a meat-packing facility, a refrigeration unit, or another entity that treats edible carcasses.

One aspect of an embodiment of the present invention is providing a food source information transferring system with RFID technology and a food source information database operatively connected to a meat-packing facility.

Another aspect of an embodiment of the present invention is providing a method of a food source information transferring system with RFID technology and a food source information database operatively connected to a meat-packing facility.

Yet another aspect of an embodiment of the present invention is creating and managing a substantially-automated food source information transferring system and a related method across livestock farming, meat processing, and meat distribution and sales chains.

In addition, another aspect of an embodiment of the present invention is providing a system and a method for holistically tracing and tracking food source information across livestock farming, meat processing, and meat distribution and sales chains to identify and manage any epidemic or contagious disease outbreak efficiently and effectively.

Furthermore, another aspect of an embodiment of the present invention is providing a system and a method for accurately tracking the quantity of transactions within livestock farming, meat processing, and meat distribution and sales chains for local, state, and national governments to provide effective oversight and implement necessary policy changes.

FIG. 1 shows a perspective view of a meat-packing facility (100) and its process flow for food source information transfer and pairing, in accordance with an embodiment of the invention. In a preferred embodiment of the invention, the meat-packing facility (100) includes a hook machine (107) that is configured to transport a plurality of hooks (103, 105), wherein each hook incorporates a hook RFID tag that is accessed by an RFID reader (151) and an RF antenna in an RFID data scan zone (101). In the example shown in FIG. 1, a first carcass (111) is attached to a first hook (105) which is hung on the hook machine (107), and a second carcass (113) is attached to a second hook (103) which is also hung on the hook machine (107). These carcasses (111, 113) on the hooks (105, 103) may come through an entrance (109) of the meat-packing facility (100) before undergoing RFID data scanning (i.e. 101), meat-chopping (i.e. 129), meat-packing (i.e. 135), and package-labeling (i.e. 143) operations.

In the example shown in FIG. 1, the second hook (103) incorporating a hook RFID tag is getting scanned by the RF antenna in the RFID data scan zone (101). In the preferred embodiment of the invention, the RF antenna operatively connected to the RFID reader (151) reads tag-identifying data from the hook RFID tag of the second hook (103), and retrieves associated data set from the food source information database (149) to add a "start" flag to indicate the beginning of chopping and packing operations for the second carcass (113).

FIG. 1 also shows a portion of a third carcass (115) laid on a meat-processing line, with some portion of the third carcass (115) getting chopped in a chopping area or a chopping machine (129). In the preferred embodiment of the invention, the chopping area or the chopping machine (129) chops and/or cuts a carcass into multiple chopped meat pieces (117, 119, 121, 123, 125, and 127), as shown in FIG. 1. The multiple chopped meat pieces (117, 119, 121, 123, 125, and 127) are then mobilized to a packing area or a packing machine (135), where one or more meat packages (131, 133) are formed by grouping certain parts of a carcass to a package, or by grouping certain parts of multiple carcasses to a package. For example, in one embodiment of the invention, cow ribs from a single carcass may be packed into one or more packages in the packing area or the packing machine (135). In another embodiment of the invention, cow ribs from multiple carcasses may be packed into one or more packages in the packing area or the packing machine (135).

Continuing with FIG. 1, once a meat package (e.g. 137) is completely packed and/or sealed, it is mobilized to a package-labeling and data-pairing area (143). In a preferred embodiment of the invention, the package-labeling and data-pairing area is capable of affixing a package label (141), which is printed by a labeling machine operatively connected to a meat-packing facility's package database system (147). In one embodiment of the invention, the meat-packing facility's package database system (147) assigns a unique package label ID (i.e. package label-identifying information) to an incoming meat package (139) entering the package-labeling and data-pairing area. In one embodiment of the invention, the unique package label ID may be printed on a surface of the package label (141) by the labeling machine (145). Subsequently, the package label (141) with the unique package label ID assigned by the meat-packing facility's database system (147) can be affixed to a surface of the incoming meat package (139). In another embodiment of the invention, the unique package label ID may be directly printed or inscribed on a surface of the incoming meat package (139) by the labeling machine (145).

In a preferred embodiment of the invention, the food source information database (149) is also operatively connected to the label machine (145) and the meat-packing facility's database system (147), so that the food source information database (149) can receive label assignment-related data for meat packages. In the preferred embodiment of the invention, a computer system executing the food source information database (149) on its CPU and its memory unit is able to place an "end" flag to a data set associated with a particular hook RFID tag to indicate which meat package(s) is associated with the particular hook RFID tag. For example, five meat packages may be "paired," or associated with a particular hook RFID tag, if the "start" flag in a data set associated with the particular hook RFID tag points to the first of the five meat packages, and if the "end" flag in the data set associated with the particular hook RFID tag points to the last of the five meat packages. In another example, one meat package may be "paired," or associated with five hook RFID tags, if the "start" flag in a data set associated with a particular meat package points to the first of the five hook RFID tags, and if the "end" flag in the data set associated with the particular meat package points to the last of the five hook RFID tags.

Continuing with FIG. 1, in one embodiment of the invention, the meat-packing facility (100) may also include a display panel (153), which is operatively connected to the RFID reader (151), the food source information database (149), the labeling machine (145), and/or the meat-packing facility's database system (147). The display panel (153) can show useful information to a human operator who is capable of monitoring and controlling the process flow in the meat-packing facility (100), as shown in screenshot examples in FIG. 3. In a preferred embodiment of the invention, the human operator exerts at least some level of control over the meat-packing facility (100) by utilizing a meat-packing facility operation controller unit, which is operatively connected to the RFID reader (151), the food source information database (149), the labeling machine (145), and/or the meat packing facility's database system (147).

Figure 2:
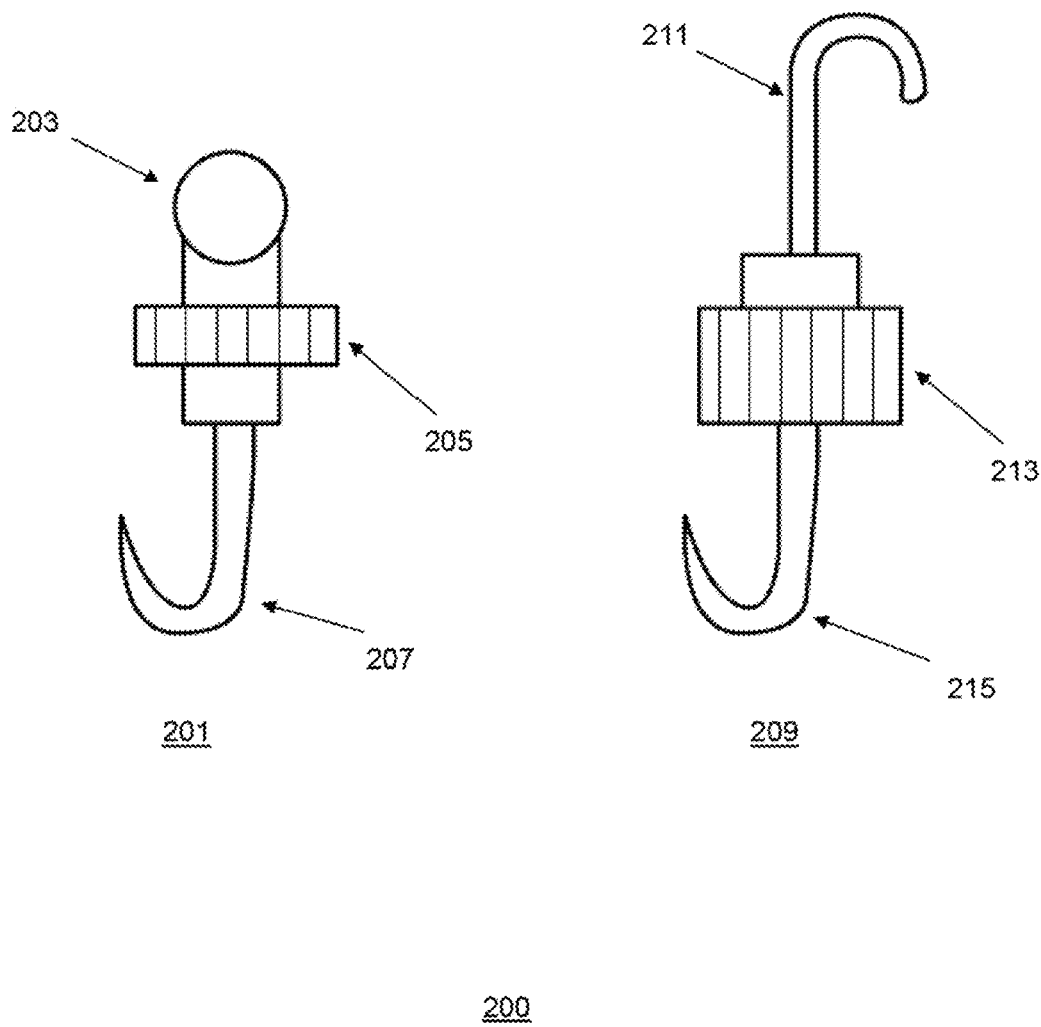
FIG. 2 shows two types of hooks that incorporate hook RFID tags in accordance with an embodiment of the invention.

FIG. 2 shows two types (201, 209) of hooks (200) that incorporate hook RFID tags (205, 213) in accordance with an embodiment of the invention. In one embodiment of the invention, a first hook type (201) with a first hook machine hanger (203) and a first carcass hanger (207) also incorporates a first hook RFID tag (205). The first hook machine hanger (203) for the first hook type (201) may be sphere-shaped, and is configured to be securely hung on a hook machine. The first carcass hanger (207) for the first hook type (201) is configured to hold an animal carcass with its hook-shaped tip, wherein both the first hook machine hanger (203) and the first carcass hanger (207) on the first hook type (201) are able to support the weight of the animal carcass during transport on the hook machine. Preferably, the first hook RFID tag (205) is a metal UHF RFID tag that can be accessed by a corresponding RF antenna operatively connected to a UHF RFID reader in a data scan zone (e.g. 101 in FIG. 1).

Furthermore, in a preferred embodiment of the invention, the first hook RFID tag (205) is a battery-less (i.e. without a battery) "passive" tag, which typically comprises a non-volatile memory unit and an RF tag antenna encapsulated by a weather-resistant covering. The RF tag antenna in the first hook RFID tag (205) is configured to receive an electromagnetic signal from an RF antenna to energize the non-volatile memory unit inside the first hook RFID tag (205) to transmit information from or send information to the non-volatile memory unit. In another embodiment of the invention, the first hook RFID tag (205) may be a battery-powered "active" tag.

In another embodiment of the invention, a second hook type (209) with a second hook machine hanger (211) and a second carcass hanger (215) also incorporates a second hook RFID tag (213). The second hook machine hanger (211) for the second hook type (209) may be hook-shaped, and is configured to be securely hung on a hook machine. The second carcass hanger (215) for the second hook type (209) is configured to hold an animal carcass with its hook-shaped tip, wherein both the second hook machine hanger (211) and the second carcass hanger (215) on the second hook type (209) are able to support the weight of the animal carcass during transport on the hook machine. Preferably, the second hook RFID tag (213) is a metal UHF RFID tag that can be accessed by a corresponding RF antenna operatively connected to a UHF RFID reader in a data scan zone (e.g. 101 in FIG. 1).

Furthermore, in a preferred embodiment of the invention, the second hook RFID tag (213) is a battery-less (i.e. without a battery) "passive" tag, which typically comprises a non-volatile memory unit and an RF tag antenna encapsulated by a weather-resistant covering. The RF tag antenna in the second hook RFID tag (213) is configured to receive an electromagnetic signal from an RF antenna to energize the non-volatile memory unit inside the second hook RFID tag (213) to transmit information from or send information to the non-volatile memory unit. In another embodiment of the invention, the second hook RFID tag (213) may be a battery-powered "active" tag.

FIG. 3 shows two screenshot examples (301A, 301B) of at least a portion of paired food source information displayed on a display panel (300) in a meat-packing facility, in accordance with an embodiment of the invention. In a preferred embodiment of the invention, the display panel (300) in the meat-packing facility has an identical or similar configuration as shown in FIG. 1, with the display panel (153) operatively connected to the RFID reader (151), the food source information database (149), the labeling machine (145), and/or the meat-packing facility's database system (147). As shown in two screenshot examples, (301A, 301B) in FIG. 3, the display panel (300) can show useful information to a human operator who is capable of monitoring and controlling the process flow in the meat-packing facility.

In the first screenshot example (301A), the display panel (300) shows a hook RFID tag ID (i.e. a number or an alphanumeric code (e.g. C200701)) on the left side and a plurality of paired package labels (e.g. D1001, D1002, D1003, D1004) on the right side. In one embodiment of the invention, this screenshot example (301A) involves a single carcass on a single hook (e.g. the hook corresponding to the hook RFID tag number or alphanumeric code "C200701" in the first screenshot example (301A)) getting chopped and placed into multiple meat packages (e.g. D1001, D1002, D1003, D1004). In this embodiment of the invention, a food source information database operatively connected to an RFID reader and an RF antenna can place a "start" flag in a data set associated with the first package label (e.g. D1001), while also pairing the single hook RFID tag number or alphanumeric code (e.g. C200701) to each package label (e.g. D1001, D1002, D1003, D1004) that will include chopped and/or cut meat pieces from the single carcass corresponding to the single hook RFID tag number or alphanumeric code (e.g. C200701). When a human operator or an automated operation system at the meat-packing facility determines that the last package label (e.g. D1004) associated with the single hook RFID tag number or alphanumeric code (e.g. C200701) is reached, the human operator or an automated operation system at the meat-packing facility can trigger an "end" flag in a data set associated with the last package label (e.g. D1004) in the food source information database.

This process can repeat with a new "start" flag and a new "end" flag for a next single hook RFID tag ID (i.e. a number or an alphanumeric code) which may be paired with one or more package labels in the meat-packing facility. The result of the data pairing between a single hook RFID tag ID and one or more package labels is a lossless and robust dynamic correlation of food source data throughout various levels and chains of livestock production and meat-processing industry that can be stored and maintained in the food source information database, which may encompass producer-level livestock information (i.e. from a livestock tag initiated from a livestock farm), slaughterhouse-level carcass information (i.e. from the hook RFID tag ID initiated from a slaughterhouse), and meat-packing facility-level packaging information (i.e. from each package label generated by a labeling machine and a meat-packing facility's database).

Continuing with FIG. 3, in the second screenshot example (301B), the display panel (300) shows a plurality of hook RFID tag ID's (i.e. numbers or alphanumeric codes (e.g. C200702, C200703, C200704, C200705)) on the left side and a single paired package label (e.g. D1005) on the right side. In one embodiment of the invention, this screenshot example (301B) involves one or more carcasses on a plurality of hooks, wherein the one or more carcasses are getting chopped and placed into a single meat package (e.g. D1005). This type of data correlation may be useful in situations in which a particular part of the meat (e.g. sirloin, ribeye, T-bone, liver, and etc.) from a plurality of carcasses needs to be placed in a single meat package. In this embodiment of the invention, a food source information database operatively connected to an RFID reader and an RF antenna can place a "start" flag in a data set associated with the first hook RFID tag (e.g. C200702), while also pairing the plurality of RFID tag numbers or alphanumeric codes (e.g. C200702, C200703, C200704, C200705) to a single package label (e.g. D1005) that will include chopped and/or cut meat pieces from the plurality of carcasses corresponding to the plurality of hook RFID tag numbers or alphanumeric codes (e.g. C200702, C200703, C200704, C200705). When a human operator or an automated operation system at the meat-packing facility determines that the last RFID hook tag (e.g. C200705) associated with the single package label (e.g. D1005) is reached, the human operator or the automated operation system at the meat-packing facility can trigger an "end" flag in a data set associated with the last RFID hook tag (e.g. C200705) in the food source information database.

This process can repeat with a new "start" flag and a new "end" flag for subsequent hook RFID tags ID's, which may be paired with one or more package labels in the meat-packing facility. The result of the data pairing between a plurality of hook RFID tag ID's and one or more package labels is a lossless and robust dynamic correlation of food source data throughout various levels and chains of livestock production and meat-processing industry that can be stored and maintained in the food source information database, which may encompass producer-level livestock information (i.e. from a livestock tag initiated from a livestock farm), slaughterhouse-level carcass information (i.e. from the hook RFID tag ID initiated from a slaughterhouse), and meat-packing facility-level packaging information (i.e. from each package label generated by a labeling machine and a meat-packing facility's database).

Furthermore, in a preferred embodiment of the invention, a human operator or an automated operation system can monitor and control real-time pairing of food source information in an RFID data scan zone and a package-labeling/data-pairing area by checking a current reading of a hook RFID tag ID (i.e. a number or alphanumeric code (e.g. C200701)) and any package labels displayed on the display panel (300) in the meat-packing facility. The human operator or the automated operation system can also verify or confirm the validity and the current status of the paired data by authorizing a correct status code entry. In one embodiment of the invention, status code definitions that can be associated with the hook RFID tag and one or more package labels include, but are not limited to, "package label assignment error," "unsuccessful data pairing," and "duplicated pairing attempt." These status code definitions may be given numerical status codes, such as 1, 2, and 3, or alphanumeric status codes, such as "PLAE" (package label assignment error), "UDP" (unsuccessful data pairing), and "DPA" (duplicated pairing attempt).

FIG. 4 shows an example of a first set of data (400) associated with a livestock tag, an example of a second set of data (415) associated with a hook RFID tag, and an example of a third set of data (425) associated with a package label, in accordance with an embodiment of the invention. In the example as shown in FIG. 4, the first set of data (400) includes tag-identifying information for the livestock tag called "Livestock Tag ID" (401). This tag-identifying information, such as an alphanumeric code "A618208," as shown in FIG. 4, can be what is stored in a livestock RFID tag, which is read by an RF antenna and an RFID reader in a data scan zone. In the preferred embodiment of the invention, the tag-identifying information can be dynamically associated with detailed livestock farm or producer-level livestock information, such as meat type (403), date of birth (405) for the livestock animal, gender (407), owner's name or identity (409), vaccine records (411), weight of an animal (413), and other pertinent information.

These detailed livestock farm or producer-level livestock information may have been recorded in a food source information database when a livestock RFID tag was scanned during the growth years for the livestock RFID tag attached to the livestock animal. In an alternate embodiment of the invention, the livestock RFID tag may also store at least some of the detailed information (e.g. 403, 405, 407, 409, 411, 413, and etc.) in its non-volatile memory unit, regardless of the dynamic association of the detailed livestock farm or producer-level livestock information in the food source information database.

Continuing with FIG. 4, in the example as shown in FIG. 4, the second set of data (415) associated with a hook RFID tag includes tag-identifying information called "Hook RFID Tag ID" (417). This tag-identifying information for the hook RFID tag, such as an alphanumeric code "C200402" as shown in FIG. 4, can be what is stored in the hook RFID tag, which is read by the RF antenna and the RFID reader in the data scan zone. In the preferred embodiment of the invention, the tag-identifying information can be dynamically associated with slaughterhouse-specific information such as slaughterhouse or plant ID (419), and also be paired with a specific livestock tag ID (421) (e.g. A618208) and status information (423), which may indicate status information such as "no carcass," "unsuccessful data pairing," and "duplicated pairing attempt," as explained previously for FIG. 3. In addition, any other desirable or pertinent information may also be part of the second set of data (415). The second set of data (415) associated with the hook RFID tag can be stored and maintained by the food source information database. In an alternate embodiment of the invention, the hook RFID tag may also store at least some of the detailed information (e.g. 419, 421, 423, and etc.) in its non-volatile memory unit, regardless of the dynamic association of the slaughterhouse-specific information and data pairing with the first set of data (400) in the food source information database.

Furthermore, in the example as shown in FIG. 4, the third set of data (425) associated with a meat package label includes label-identifying information called "Package Label ID" (427). This label-identifying information for the meat package label, such as an alphanumeric code "D3213" as shown in FIG. 4, can be what identifies the third set of data (425) in the food source information database, wherein the third set of data (425) is associated with both the meat package label ID (427) and one or more hook RFID tag ID's (431). In addition, in one embodiment of the invention, the third set of data (425) stored and maintained in the food source information database also includes a meat-packing facility ID (429), status information (433), and/or any other desirable or pertinent information.

In one embodiment of the invention, a meat package label may be a paper label attached to or printed on a meat package. In another embodiment of the invention, the meat package label could be stored electronic information in a meat-package RFID tag attached to the meat package. In a preferred embodiment of the invention, the label-identifying information can be dynamically associated with the meat packing facility-specific information such as the meat-packing facility ID (429), one or more hook RFID tag ID's (431), and status information (433). In one embodiment of the invention, status code definitions corresponding to the status information (433) may include information such as "package label assignment error," "unsuccessful data pairing," and "duplicated pairing attempt." These status code definitions may be represented by numerical status codes in the third set of data (425), such as 1, 2, and 3, or alphanumeric status codes, such as "PLAE" (package label assignment error), "UDP" (unsuccessful data pairing), and "DPA" (duplicated pairing attempt).

FIG. 5 shows two examples (500) of data pairing, each example of which associates a first set of data, a second set of data, and a third set of data, in accordance with an embodiment of the invention. A first data association example (501A) shows pairing of a single livestock tag with a plurality of hook RFID tags, followed by pairing with a plurality of meat package labels. In this particular case, the single livestock tag has alphanumeric code "A531821" as tag-identifying information. If an animal carcass identified by this single livestock tag is divided into two pieces and hung in two separate hooks in a slaughterhouse processing operation, then two hook RFID tags with hook RFID tag ID's "C100101" and "C100102" are dynamically paired (i.e. associated) with the single livestock tag "A531821" in a food source information database. In a preferred embodiment of the invention, once a livestock tag ID is paired with one or more hook RFID tags, any underlying data associated with either of the tags also get dynamically associated in the food source information database.

Moreover, in the preferred embodiment of the invention, the data pairing can extend to meat package labels, with each hook RFID tag corresponding to one or more meat package labels in the first data association example (501A). As shown in FIG. 5 for the first data association example (501A), the first hook RFID tag with hook RFID tag ID "C100101" is dynamically paired (i.e. associated) with three meat package label ID's, "D2001," "D2002," and "D2003," in the food source information database. Furthermore, the second hook RFID tag with hook RFID tag ID "C100102" is dynamically paired (i.e. associated) with one meat package label ID, "D2004," in the food source information database. Once the data pairing is completed, a user accessing the food source information database can trace and manage relevant and detailed meat producer-level and meat processing-level food source information by simply entering a meat package label ID.

Furthermore, FIG. 5 also shows a second data association example (501B) that pairs a plurality of livestock tags with a plurality of hook RFID tags, followed by data pairing to a single meat package label, "D9001." In this particular case, four livestock tags with alphanumeric codes "A412341," "A412342," "A732341," and "A732342" are shown as tag-identifying information. The second data association example (501B) shows several possibilities of paired correlation among livestock tags, hook RFID tags, and a single meat package label. For example, the first livestock tag, A412341, has a one-to-one correspondence to a first hook RFID tag, C100201. This suggests that the animal carcass associated with the first livestock tag, A412341, is held or represented by a single hook incorporating the first hook RFID tag, C100201. Furthermore, the first hook RFID tag, C100201, pointing to the single meat package label, D9001, suggests that all contents of the animal carcass associated with the first livestock tag is packed into a single meat package corresponding to the single meat package label, D9001.

Unlike the first livestock tag, the second livestock tag, A412342, corresponds to two hook RFID tags, C100202 and C100203. This suggests that the animal carcass associated with the second livestock tag, A412342, is held or represented by two hooks incorporating the two hook RFID tags, C100202 and C100203. Because only one (i.e. C100202) of the two hook RFID tags is paired with the single meat package (i.e. D9001), it can be inferred that only the contents from C100202 is packed into the single meat package, D9001.

Furthermore, in the second data association example (501B), the third livestock tag, A732341, corresponds to a single hook RFID tag, C100204, but the fourth livestock tag, A732342, also partially corresponds to the same single hook RFID tag, C100204. This means that one hook that incorporates C100204 as its hook RFID tag holds or represents an animal carcass represented by the third livestock tag, A732341, and also additionally holds or represents part of another animal carcass represented by the fourth livestock tag, A732342. In this example, the remaining portion of the animal carcass represented by the fourth livestock tag, A732342, is also distributed to the last two hooks incorporating C100205 and C100206 as hook RFID tags.

As shown by the second data association example (501B), in some slaughterhouse and other meat processing operations, it may be desirable to divide a single body of animal carcass into multiple pieces and use a plurality of hooks to hold those multiple pieces. Furthermore, it may also be desirable to enable a single hook to hold multiple pieces of a plurality of animal carcasses. In all of such situations, one or more embodiments of the present invention are able to pair, associate, record, retrieve, and manage a variety of singular or multiple correlations between livestock tags and hook RFID tags using a food source information transferring system and a related database.

Moreover, in one embodiment of the invention, rectangles surrounding four hook RFID tags, C100201, C100202, C100204, and C100206, represent the four corresponding hooks that hold specific parts of multiple animal carcasses, such as cows' ribeye parts or cows' sirloin parts, that can be packed into the single meat package, D9001, at the meat-packing facility described in various embodiments of the present invention. For example, a "sirloin" meat package may contain sirloin parts from a multiple number of cows that correspond to a multiple number of hook RFID tags and a multiple number of livestock tags. In such situations, one or more embodiments of the present invention can pair, associate, record, retrieve, and manage such complex correlations among livestock tags, hook RFID tags, and meat package label(s) using a food source information transferring system and a related database.

Figure 6:
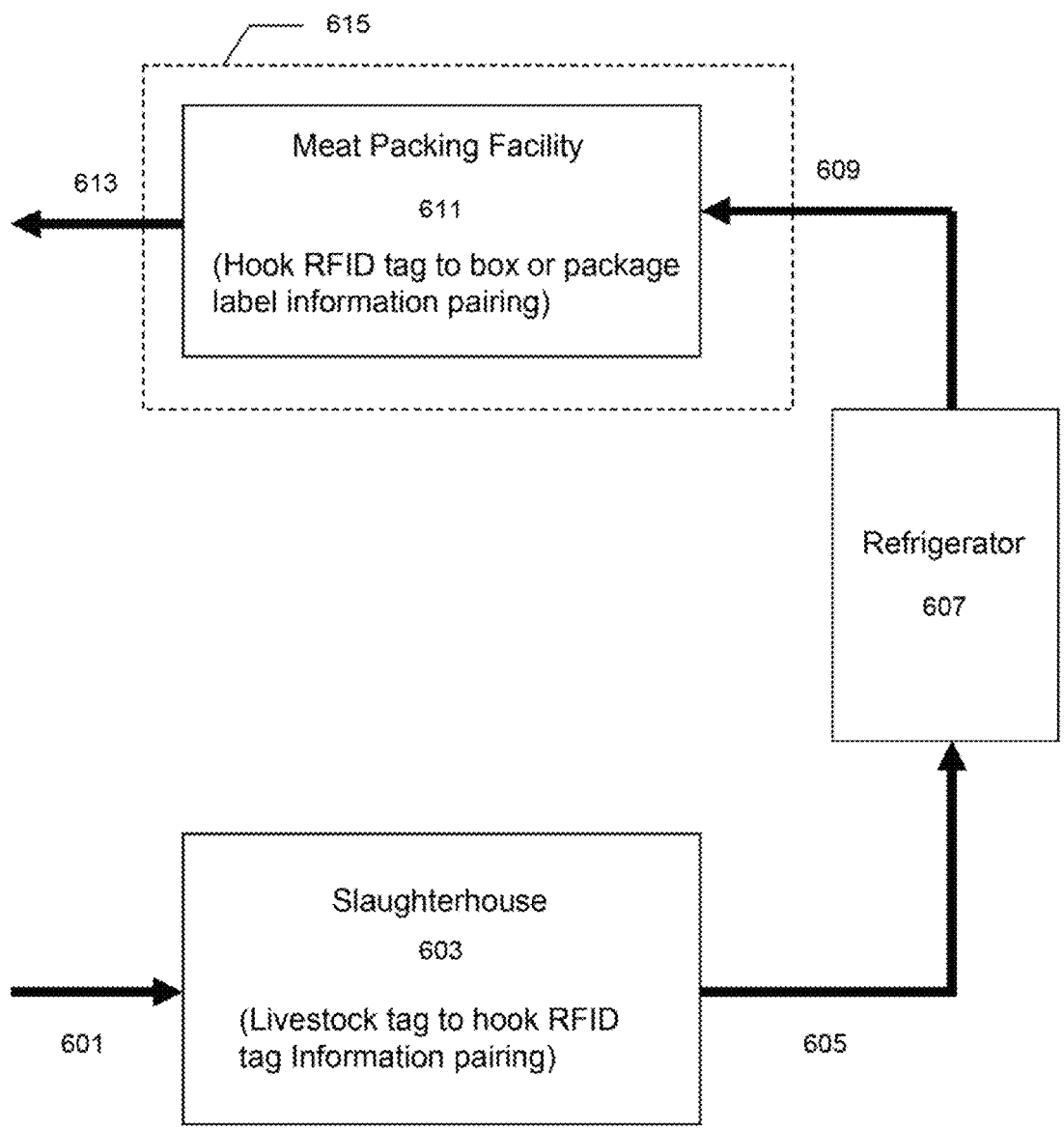
FIG. 6 shows an overview of food source information transfer process in accordance with an embodiment of the invention.

FIG. 6 shows an overview (600) of food source information transfer process in accordance with an embodiment of the invention. In a preferred embodiment of the invention, a perforated section (615) represents food source information pairing, transfer, and management in a meat-packing facility (611), which have been previously described and illustrated in FIGS. 1~5. As shown in this overview (600), a batch of incoming livestock (601) enters the slaughterhouse (603) and is slaughtered and processed in accordance with local, state, and/or national government regulations. In the preferred embodiment of the invention, each carcass in the slaughterhouse (603) is hung on a hook machine using a hook incorporating a hook RFID tag, and each carcass is then processed sequentially in a data scan zone for food source information pairing between a livestock tag on the carcass and the hook RFID tag incorporated in the hook.

Once the data pairing between the livestock tag and the hook RFID tag is completed and stored in a food source information database for each carcass, the slaughterhouse (603) performs any additional meat processing, if necessary, and transports (i.e. 605) each processed carcass to a refrigerator (607) using a hook machine or another transport device. Then, in the preferred embodiment of the invention, each processed carcass on a hook undergoes a hook RFID tag-reading and data-checking procedure in a data scan zone near an entrance door of the refrigerator (607). If the hook RFID tag-reading and the data-checking procedure are successful at the refrigerator (607), then the processed carcass corresponding to the hook RFID tag is placed inside the refrigerator (607) for a specified period of time. Subsequently, the processed carcass with the hook RFID tag is taken out of the refrigerator and undergoes a hook RFID tag-reading and data-recording procedure in a data scan zone near an exit door of the refrigerator (607), as also previously shown and described in association with FIGS. 4~5.

Continuing with FIG. 6, the processed carcass with the hook RFID tag, which is taken out of the refrigerator (607), is then transported (i.e. 609) to a meat-packing facility (611), where meat-chopping and meat-packing operations are performed. In a preferred embodiment of the invention, the information pairing between the hook RFID tag and one or more corresponding package labels is also performed during or after meat-chopping and meat-packing operations inside the meat-packing facility (611), as previously described and illustrated in FIGS. 1~5. When all desirable or necessary operations are completed from the meat-packing facility (611), packaged meat products can then be transported (i.e. 613) to other meat processing facilities or distribution channels.

Figure 7:
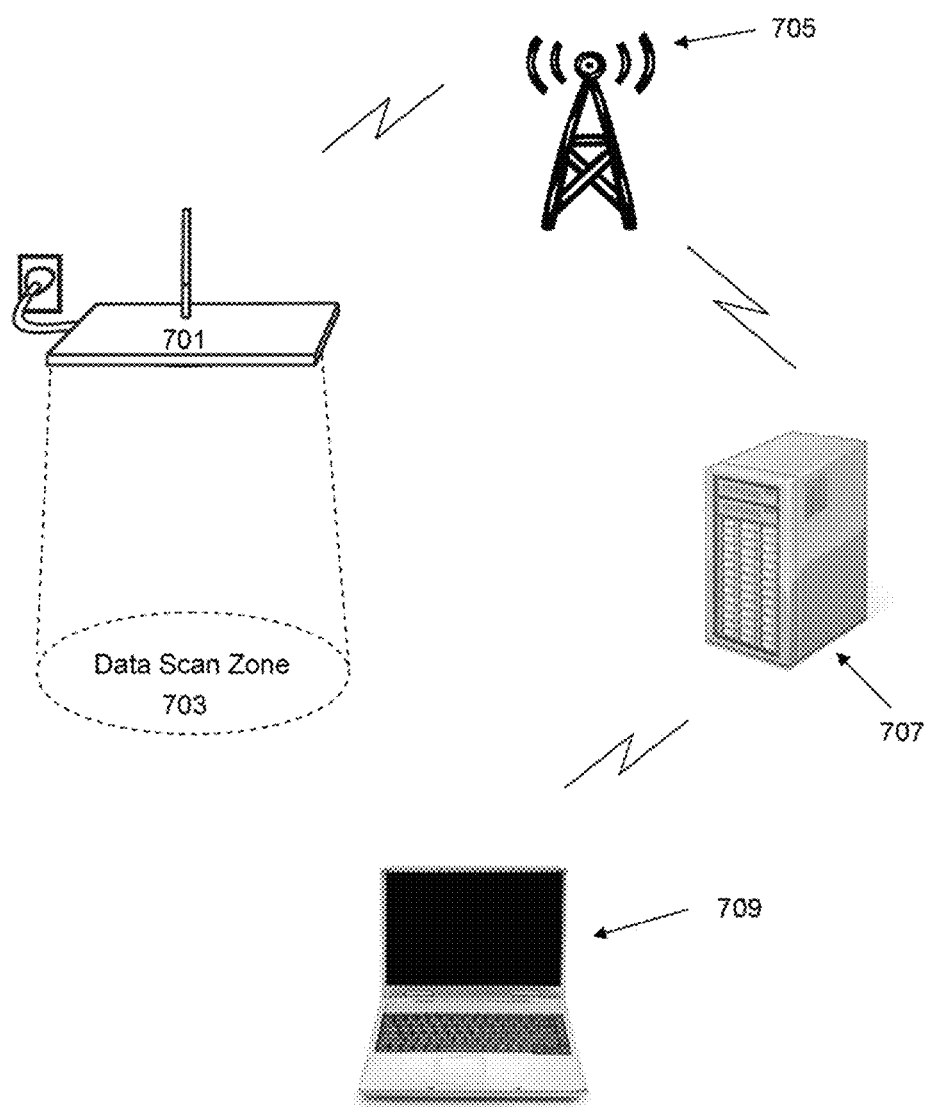
FIG. 7 shows a high-level device connection for a food source information transferring system in accordance with an embodiment of the invention.

FIG. 7 shows a high-level device connection (700) for a food source information transferring system in accordance with an embodiment of the invention. In a preferred embodiment of the invention, the food source information transferring system includes an RFID reader with an integrated or discrete RF antenna (701), which define a data scan zone (703). The RFID reader with an integrated or discrete RF antenna (701) is operatively connected to a computer server (707) or another computer system device via a wireless data connection (705), a wired data connection, or a combination thereof. In the preferred embodiment of the invention, the computer server (707) is configured to operate a food source information database which can be executed on a CPU and a memory unit of the computer server (707).

In a preferred embodiment of the invention, the food source information database can utilize information read from a hook RFID tag incorporated in a hook, or from any other type of RFID tags used in a meat-packing facility for meat-chopping, meat-packing, and other meat-processing applications. For example, the food source information database can pair and store the data associated with tag-identifying information in the hook RFID tag and the data associated with one or more meat package labels to create and maintain a robust set of food source information for each meat package, which can be traced for detailed food source information at all levels of livestock production and meat processing with dynamically-associated data in the food source information database, as described and illustrated by FIGS. 4~5.

The food source information database may already contain some livestock producer-level food source information that are identifiable by tag-identifying information of livestock RFID tags, and may also contain slaughterhouse-level food processing information that are identifiable by tag-identifying information of hook RFID tags before any operation is performed in the meat-packing facility. Furthermore, data sets from the livestock producer-level and the slaughterhouse-level food source information may already have been paired and dynamically associated, prior to the additional pairing of data with the data associated with meat package labels in the meat-packing facility.

Continuing with FIG. 7, the computer server (707) in the food source information transferring system is also operatively connected to a user display terminal (709) or a computer display that displays useful information to a system user. As previously shown in FIG. 1 and FIG. 3, a display panel (e.g. 153 of FIG. 1, or 300 of FIG. 3) can be also operatively connected to the food source information transferring system. In the preferred embodiment of the invention, a keyboard, a keypad, an operation controller, or another user input method is operatively connected to the user display terminal (709) or the computer display for retrieving and controlling information associated with the food source information database.

Figure 8:
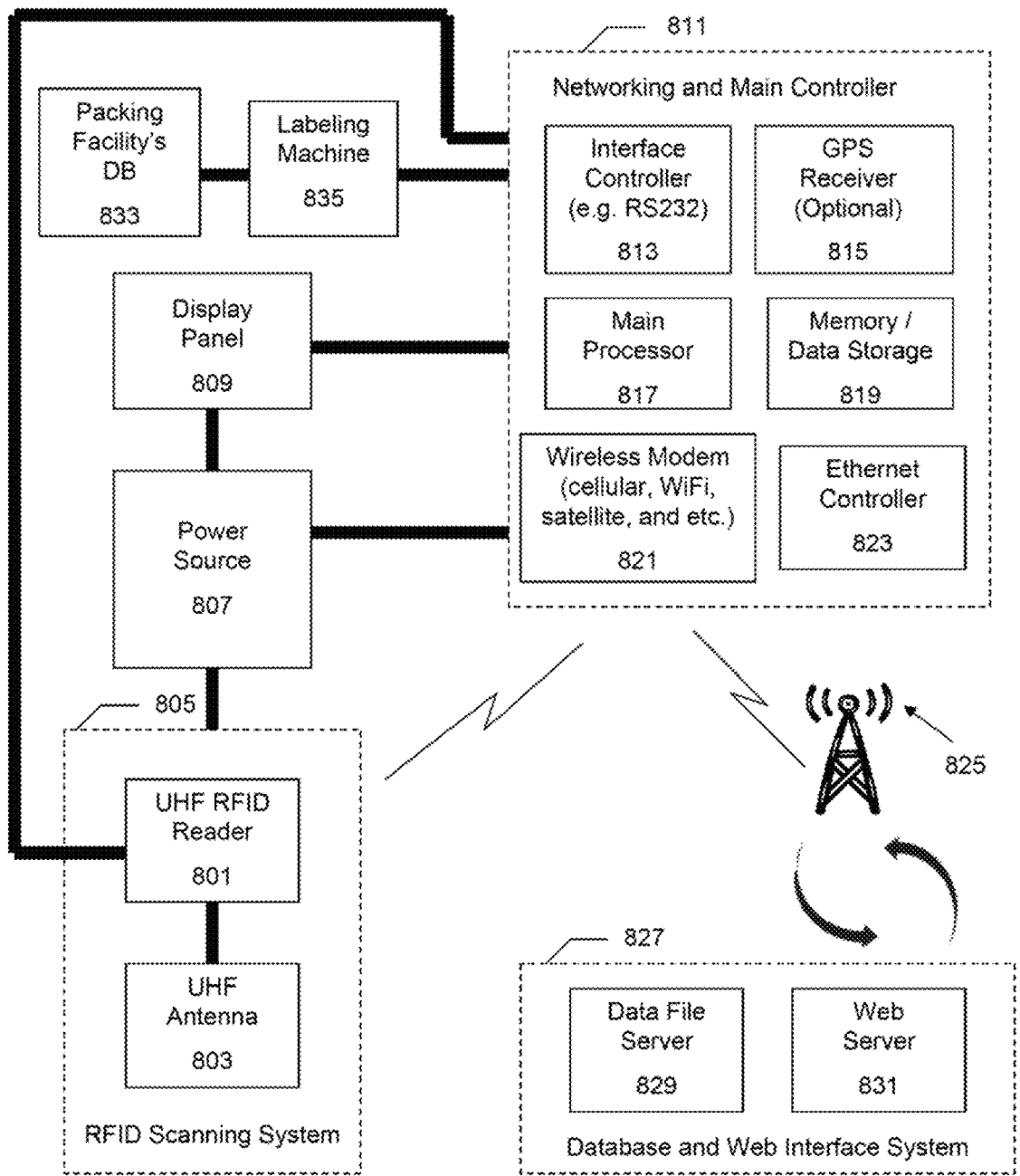
FIG. 8 shows a food source information transferring system in accordance with an embodiment of the invention.

FIG. 8 shows a food source information transferring system (800) that can be used for a meat-packing facility, in accordance with an embodiment of the invention. In a preferred embodiment of the invention, the food source information transferring system (800) comprises a networking and main controller system (811), an RFID scanning system (805), a power source (807), a display panel (809), a wireless and/or wired communication network (825), and a database and web interface system (827). Furthermore, the food source information transferring system (800) may also include a labeling machine (835) that issues package labels and a meat-packing facility's database system (833) for package labeling-related data management. In the preferred embodiment of the invention, a first RFID scanning system (805) and a corresponding display panel (809 in FIG. 8) may be installed in a meat-packing facility, as also shown in FIG. 1. Furthermore, in one embodiment of the invention, a second RFID scanning system may be installed inside or near a package-labeling and/or data-pairing area (e.g. 143 in FIG. 1), which may be particularly useful if package labels are based on RFID package tags. In another embodiment of the invention, the second RFID scanning system may not be necessary inside or near the package-labeling and/or data-pairing area (e.g. 143 in FIG. 1), because package labels are printed on paper and attached on a surface of a meat package, or inscribed on the surface of the meat package.

Furthermore, in the food source information transferring system (800) as shown in FIG. 8, the labeling machine (835) and/or the meat-packing facility's database system (833) are configured to transmit package label-related data to the networking and main controller (811), and ultimately to a food source information database operating in the database and web interface system (827). In one embodiment of the invention, the meat-packing facility's database system (833) is responsible for assigning unique package label ID's and maintaining their related records for internal use within the meat-packing facility. In addition, the labeling machine (835) is capable of printing or inscribing package labels on a surface of a meat package.

However, the meat-packing facility's database system (833) generally does not encompass or track different levels of food source information from livestock producers to various stages of meat processing. Rather, the meat-packing facility's database system (833) is typically designed primarily for internal generation and management of package label data within the meat-packing facility. Therefore, in the preferred embodiment of the invention, it is the food source information database operating in the database and web interface system (827) that is able to associate and manage various levels of food source information data holistically by gathering food source information data from multiple levels and stages of livestock production and meat processing. In the preferred embodiment of the invention, the food source information database operating in the database and web interface system (827) is capable of incorporating package label information from the meat-packing facility's database system (833) and the labeling machine (835). Various embodiments of data-pairing with package label-related data in the food source information database have been described in this Specification and also shown in related figures.

Continuing with FIG. 8, in one embodiment of the invention, the power source (807) may be provided by an electrical outlet, a battery, an alternative energy generator such as a wind turbine or a solar panel, or a combination thereof. The power source (807) is configured to provide electrical power to the RFID scanning system (805) and the display panel (809). The networking and main controller (811), the meat-packing facility's database system (833), and/or the labeling machine (835) may be operatively connected to the same power source (807) or a different power source. Furthermore, the display panel (809) and the RFID scanning system (805) are operatively connected to the networking and main controller (811) for data communication, which can be accomplished by wireless and/or wired communication methods.

In one embodiment of the invention, the RFID scanning system (805) comprises a UHF RFID tag reader (801) operatively connected to a UHF antenna (803), which enables and defines a data scan zone, as described in FIGS. 1 and 7 previously. Furthermore, in one embodiment of the invention, the networking and main controller system (811) comprises an interface controller (813), a main processor (817), a memory unit and a data storage (819), a wireless modem (821), an Ethernet controller (823), and optionally a GPS receiver (815). The networking and main controller system (811) is designed to control and manage the display panel (809), the power source (807), and the RFID scanning system (805). Furthermore, the networking and main controller (811) may also control at least some functions related to the meat-packing facility's database system (833) and the labeling machine (835). Moreover, the networking and main controller system (811) can retrieve, store, change, and manage food source information data from a food source information database operating in the database and web interface system (827), and also from an RFID tag read in the data scan zone from the RFID scanning system (805).

In one embodiment of the invention, at least some portions of the networking and main controller system (811) is a portable unit, wherein the portable unit is capable of communicating with the RFID scanning system (805), the display panel (809), and the database and web interface system (827) via a local area network (LAN), an Internet connection, and/or a wired or wireless data connection using the Ethernet controller (823), the wireless modem (821), and the interface controller (813) of the networking and main controller system (811). In a preferred embodiment of the invention, the portable unit utilizes RS232 or RS485 communication interfaces (e.g. 813) to communicate with at least some parts of the food source information transferring system. Furthermore, the GPS receiver (815) may assist identifying the current location of the portable unit or another device unit relative to the RFID scanning system (805) and the database and web interface system (827). In another embodiment of the invention, the networking and main controller system (811) may be entirely a fixed unit attached to one particular location, such as a wall of a building or a device system tower.

Furthermore, some features of the networking and main controller system (811) include, but are not limited to, executing an application program on the microprocessor (817) and the memory and the data storage unit (819) to access RFID tag data from the data scan zone, and a user interface (e.g. a keypad, a keyboard, buttons, switches, and etc. on the networking and main controller unit (811)) to control and manage operations of the RFID scanning system (805), the power source (807), the display panel (809), and at least some features in the database and web interface system (827) such as data retrieval or recording in the food source information database.

Continuing with FIG. 8, in a preferred embodiment of the invention, the database and web interface system (827) comprises a data file server (829) and a web server (831), which may be separate computer server units or a combined integrated computer server unit. The data file server (829) may function as a network attached storage (NAS) that stores and updates food source information data associated with a livestock tag, a hook RFID tag, and/or a package label. Preferably, a CPU and a memory unit of the data file server (829) operates the food source information database. Furthermore, the web server (831) may store and operate an Internet application module to provide a user interface to control, manage, and/or visualize data or control interfaces associated with the food source information transferring system and the food source information database. This user interface may be accessed by a computer terminal, a mobile device, or a networking and main controller system (e.g. 811).

Figure 9:
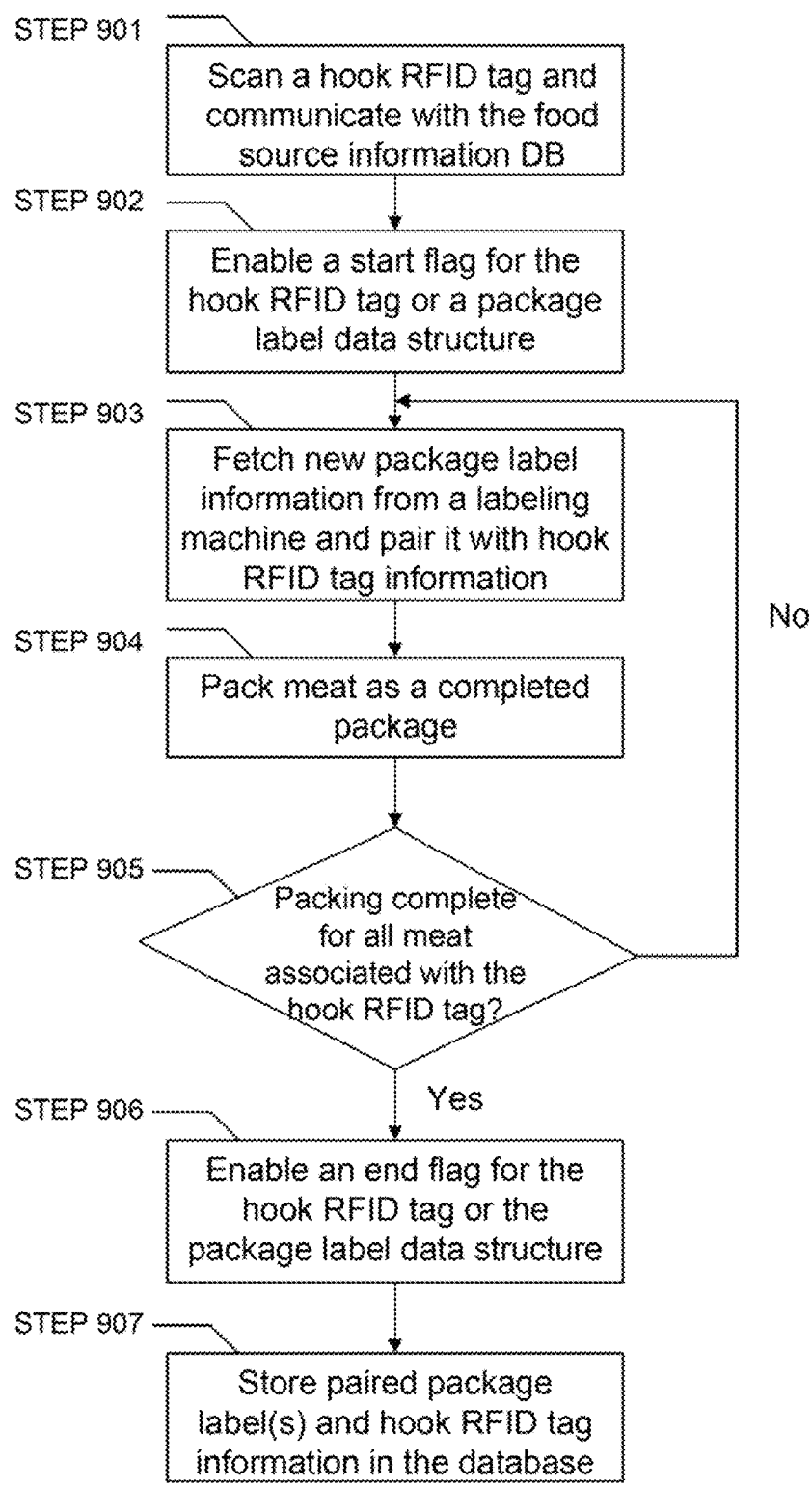
FIG. 9 shows a flowchart for a method of pairing one or more package labels with a particular hook RFID tag in accordance with an embodiment of the invention.

FIG. 9 shows a flowchart (900) for a method of pairing one or more package labels with a particular hook RFID tag in accordance with an embodiment of the invention. In one embodiment of the invention, a food source information transferring system operating in association with a meat-packing facility scans a particular hook RFID tag using an RF antenna and an RFID reader, and transmits scanned information to a food source information database operating on a CPU and a memory unit of a computer system device, as shown in STEP 901. Then, the food source information transferring system can enable a "start" flag for a data set associated with the particular hook RFID tag and/or a data set associated with a package label, as shown in STEP 902 and further elaborated previously in FIGS. 3~4. During meat-chopping and/or meat-packing operations, the food source information transferring system can fetch new package label information from a labeling machine and/or a meat-packing facility's database system, and subsequently pair the new package label information with the data set associated with the particular hook RFID tag, as shown in STEP 903.

Once a particular meat package is filled with meat and attached and/or inscribed with the new package label, as shown in STEP 904, the food source information transferring system can check whether meat packing is complete for all meat associated with the particular hook RFID tag, as shown in STEP 905. If the meat packing is not complete for all meat associated with the particular hook RFID tag, then the food source information transferring system loops to STEP 903, in which a next package label is fetched from the labeling machine and paired with the particular hook RFID tag information. Then, at least a portion of the remaining meat associated with the particular hook RFID tag is packed into a new meat package, and the new meat package is attached and/or inscribed with the next package label (i.e. STEP 904).

At some point in these procedures, if the meat packing is complete for all meat associated with the particular hook RFID tag, as shown in STEP 905, then the food source information transferring system can enable an "end" flag for the data set associated with the particular hook RFID tag and/or for the data set associated with the package labels, as shown in STEP 906. Then, the food source information transferring system can store paired package label(s) and the particular hook RFID tag information in the food source information database, as shown in STEP 907.

Figure 10:
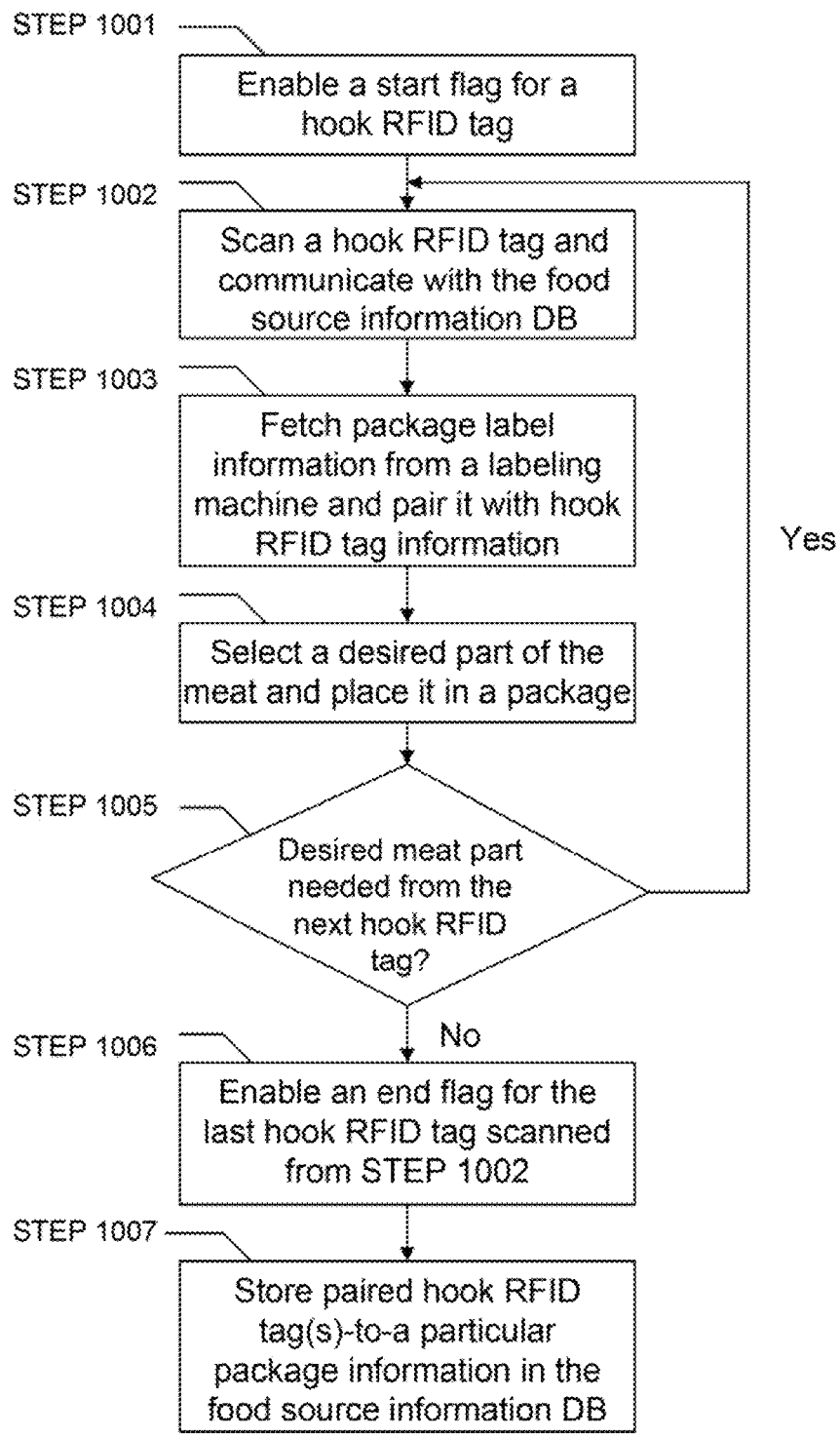
FIG. 10 shows a flowchart for a method of pairing a particular package label with one or more hook RFID tags, in accordance with an embodiment of the invention.

FIG. 10 shows a flowchart (1000) for a method of pairing a particular package label with one or more hook RFID tags, in accordance with an embodiment of the invention. In one embodiment of the invention, a food source information transferring system operating in association with a meat-packing facility first enables a start flag for a data set associated with a first hook RFID tag, when the hook RFID tag enters a data scan zone (e.g. 101 of FIG. 1), as shown in STEP 1001. Then, an RF antenna and an RFID reader operatively connected to the food source information transferring system can scan the first hook RFID tag and transmit scanned information to a food source information database operating on a CPU and a memory unit of a computer system device, as shown in STEP 1002.

Then, during meat-chopping and/or meat-packing operations, the food source information transferring system can fetch particular package label information from a labeling machine and/or a meat-packing facility's database system, and subsequently pair the particular package label information with the data set associated with the first hook RFID tag, as shown in STEP 1003. Then, a desired part of the meat associated with the first hook RFID tag is selected and placed inside a meat package, as shown in STEP 1004. If the meat package is not completely filled with the desired part of the meat, then a new piece of meat associated with a next hook RFID tag undergoes STEPS 1002~1004, until the meat package is completely filled, as shown in STEP 1005.

Once the meat package is completely filled and packaged with the desired part of the meat, the food source information transferring system can enable an "end" flag for the data set associated with the latest-scanned hook RFID tag from STEP 1002, as shown in STEP 1006. Furthermore, the particular package label generated from the labeling machine can be attached to or printed on the meat package. Then, the food source information transferring system can store paired information between hook RFID tag(s) and the particular package label in the food source information database, as shown in STEP 1007.

Various embodiments of the food source information transferring system and related methods for a meat-packing facility have been illustrated in FIGS. 1~10 and described above. The present invention provides numerous advantages over conventional food source information tracking systems or methods. By utilizing a concept of a novel hook RFID tag which is incorporated in a hook configured to be hung on a hook machine, various embodiments of the present invention enable a seamless and convenient transfer of food source information data among a first set of data associated with livestock farm or producer-level information identified by a livestock tag, a second set of data associated with a particular hook holding a particular carcass in the meat-packing facility or a slaughterhouse, and a third set of data associated with a particular package label generated from a labeling machine in the meat-packing facility during and/or after meat-chopping and meat-packing operations.

Furthermore, the novel pairing of information among livestock tags, hook RFID tags, and meat package labels, as embodied by various embodiments of the invention, can be designed to be automated and lossless, thereby ensuring that all of the detailed information associated with the livestock tag, such as date of birth, gender, original livestock owner, vaccine records, and weight of an animal, are retained in subsequent meat processing, packing, distribution, and sales operations. The lossless retention of detailed food source information at every stage of livestock farming, meat processing, packing, distribution, and sales operations ensures that any meat-related problems, diseases, epidemic, and/or quality control can be readily identified and managed by appropriate authorities and governing entities.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A food source information transferring system for a meat-packing facility, the food source information transferring system comprising:

a data scan zone defined by an RFID signal projection from an RF antenna operatively connected to an RFID reader;

a hook that holds multi-carcass grouped meat parts derived from a multiple number of animal carcasses, wherein the multi-carcass grouped meat parts hung on the hook embed a multiplicity of livestock RFID tag information corresponding to the multiple number of animal carcasses;

a hook RFID tag incorporated or embedded in the hook that holds the multi-carcass grouped meat parts derived from the multiple number of animal carcasses, when the hook is hung on a hook machine, wherein the hook machine is designed to transport the multi-carcass grouped meat parts on the hook from one location to another location;

the RFID reader reading from the hook RFID tag and the multi-carcass grouped meat parts embedding the multiplicity of livestock RFID tag information corresponding to the multiple number of animal carcasses, when the hook RFID tag is inside the data scan zone, wherein the RFID reader is further configured to place a start flag or an end flag in a first data set associated with the hook RFID tag, and in a second data set associated with a package label;

a meat-packing facility' database system configured to assign a unique package label identification for a meat package containing chopped pieces of meat from the multi-carcass grouped meat parts;

a labeling machine configured to generate the package label with the unique package label identification, which is printed or attached to the meat package;

a food source information database operating on a CPU and a memory unit of a computer system device which is operatively connected to the RFID reader, the meat-packing facility's database system, and/or the labeling machine, wherein the food source information database pairs the multiplicity of livestock RFID tag information in the multi-carcass grouped meat parts per hook with the hook RFID tag and the second data set associated with the package label, so that a multi-carcass source-to-single hook data correlation is traceably established for the package label; and a meat-packing facility operation controller unit operatively connected to the RFID reader and the food source information database, wherein the meat-packing facility operation controller unit at least partially controls components of the RFID reader and the food source information database.

2. The food source information transferring system of claim 1, further comprising a display panel operatively connected to the meat-packing facility operation controller unit, wherein the display panel shows a current status of data pairing between the first data set associated with the hook RFID tag and the second data set associated with the package label.

3. The food source information transferring system of claim 1, further comprising a package-labeling and data-pairing area, wherein the package label with the unique package label identification is generated by the labeling machine in the package-labeling and data-pairing area, and wherein the first data set associated with the hook RFID tag is paired with the second data set associated with the package label also in the package-labeling and data-pairing area.

4. The food source information transferring system of claim 1, further comprising a chopping area or a chopping machine for transforming the multi-carcass grouped meat parts derived from the multiple number of animal carcasses into the chopped pieces of meat.

5. The food source information transferring system of claim 1, further comprising a packing area or a packing machine for packing the chopped pieces of meat into the meat package.

6. The food source information transferring system of claim 1, further comprising a wireless transceiver operatively connecting the RFID reader and the computer system device executing the food source information database in its CPU and its memory unit for data communication.

7. The food source information transferring system of claim 1, wherein the first data set associated with the hook RFID tag includes hook RFID tag identification, slaughterhouse identification, paired livestock tag identification, pairing status information, the start flag, the end flag, and/or other meat-processing information.

8. The food source information transferring system of claim 1, wherein the second data set associated with the package label includes package label identification, meat-packing facility identification, hook RFID tag identification, pairing status information, the start flag, the end flag, and/or other meat-processing information.

9. The food source information transferring system of claim 1, wherein the meat-packing facility operation controller unit is also a networking and main controller of the food source information transferring system.

10. The food source information transferring system of claim 1, further comprising a power source unit operatively connected to the RFID reader, the RF antenna, and the meat-packing facility operation controller unit.

11. The food source information transferring system of claim 1, wherein the computer system device executing the food source information database on its CPU and its memory unit comprises one or more computer servers that function as a data file server.

12. The food source information transferring system of claim 1, further comprising a user interface device operatively connected to the computer system device for data retrieval, recordation, and management related to the food source information database.

13. The food source information transferring system of claim 1, wherein the hook RFID tag is a battery-less passive tag, and wherein the RFID tag comprises a non-volatile memory unit and an embedded RF antenna unit.

14. A method of transferring food source information among livestock producer-level food source data, slaughterhouse-level food source data, and meat-packing facility-level food source data, the method comprising the steps of:

transporting multi-carcass grouped meat parts derived from a multiple number of animal carcasses to a hook machine, wherein the multi-carcass grouped meat parts embed a multiplicity of livestock RFID tag information corresponding to the multiple number of animal carcasses;

placing the multi-carcass grouped meat parts to the hook machine with a hook containing a hook RFID tag;

bringing the multi-carcass grouped meat parts on the hook machine to a data scan zone in a meat-packing facility;

reading the multi-carcass grouped meat parts embedded with the multiplicity of livestock RFID tag information with an RF antenna and an RFID reader operatively connected to a food source information database;

reading the hook RFID tag with the RF antenna and the RFID reader operatively connected to the food source information database;

pairing the multiplicity of livestock RFID tag information in the multi-carcass grouped meat parts per hook with the hook RFID tag, so that a multi-carcass source-to-single hook data correlation is traceably established in a first data set associated with the hook RFID tag;

enabling a start flag for the first data set associated with the hook RFID tag, and for a second data set associated with a package label;

fetching new package label information from a labeling machine, wherein the new package label information is part of the second data set;

pairing the first data set associated with the hook RFID tag with the second data set associated with the package label in the food source information database;

packing meat chopped from the multi-carcass grouped meat parts in a meat package;

printing or attaching the package label from the labeling machine to the meat package; and when the meat package is completed, enabling an end flag for the first data set associated with the hook RFID tag or for the second data set associated with the package label, and storing a status code and paired information of the first data set and the second data set in the food source information database.

15. The method of claim 14, wherein the status code includes status code definitions that are functionally equivalent to indicating "package label assignment error," "unsuccessful data pairing," and "duplicated pairing attempt."

16. The method of claim 14, wherein the food source database is executed on a CPU and a memory unit of a computer system device operatively connected to the RFID reader and the RF antenna.

17. The method of claim 14, wherein the first data set associated with the hook RFID tag includes hook RFID tag identification, slaughterhouse identification, paired livestock tag identification, pairing status information, the start flag, the end flag, and/or other meat-processing information.

18. The method of claim 14, wherein the second data set associated with the package label includes package label identification, meat-packing facility identification, hook RFID tag identification, pairing status information, the start flag, the end flag, and/or other meat-processing information.

* * * * *